US006965696B1

(12) United States Patent
Tokuyama et al.

(10) Patent No.: US 6,965,696 B1
(45) Date of Patent: Nov. 15, 2005

(54) IMAGE PROCESSING DEVICE FOR IMAGE REGION DISCRIMINATION

(75) Inventors: Mitsuru Tokuyama, Soraku-gun (JP); Masatsugu Nakamura, Kashiba (JP); Mihoko Tanimura, Nara (JP); Masaaki Ohtsuki, Yamatokoriyama (JP); Norihide Yasuoka, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 871 days.

(21) Appl. No.: 09/684,122

(22) Filed: Oct. 6, 2000

(30) Foreign Application Priority Data

Oct. 14, 1999 (JP) .......................................... 11-291947

(51) Int. Cl.[7] .................................................. G06T 7/40

(52) U.S. Cl. ....................... 382/224; 382/226; 382/227; 382/273; 382/276; 382/180; 382/205; 358/2.1; 358/3.22; 358/462; 358/466; 358/448

(58) Field of Search ................................ 382/173, 176, 382/180, 227, 182–226; 358/2.1, 3.22, 448, 462, 466

(56) References Cited

U.S. PATENT DOCUMENTS

| | | | | | |
|---|---|---|---|---|---|
| 5,659,402 | A | * | 8/1997 | Fujita et al. | 358/2.1 |
| 5,892,592 | A | | 4/1999 | Adachi et al. | 358/462 |
| 5,982,946 | A | * | 11/1999 | Murakami | 382/272 |
| 6,052,484 | A | * | 4/2000 | Kobayashi | 382/195 |
| 6,111,975 | A | * | 8/2000 | Sacks et al. | 382/103 |
| 6,111,982 | A | * | 8/2000 | Adachi | 382/176 |
| 6,473,202 | B1 | * | 10/2002 | Kanata et al. | 358/2.1 |
| 6,631,210 | B1 | * | 10/2003 | Mutoh et al. | 382/176 |

FOREIGN PATENT DOCUMENTS

| | | |
|---|---|---|
| EP | 0 902 585 A2 | 3/1999 |
| JP | 5-50187 | 7/1993 |
| JP | 10-271326 | 4/1998 |
| JP | 11-027517 | 1/1999 |
| JP | 11-069150 | 3/1999 |
| JP | 11-096372 | 4/1999 |

OTHER PUBLICATIONS

Office Action for corresponding application number 11–291947 from Japan Patent Office mailed Aug. 26, 2004 (4 pp.) and English translation thereof (8 pp).

* cited by examiner

*Primary Examiner*—Leo Boudreau
*Assistant Examiner*—Patrick Edwards
(74) *Attorney, Agent, or Firm*—Edwards & Angell, LLP; David G. Conlin; George W. Hartnell, III

(57) ABSTRACT

An image processing device of the present invention is provided with four kinds of sub masks in total including two kinds in a main scanning direction and two kinds in a sub scanning direction, in a main mask constituted by a plurality of pixels including a target pixel. In the image display device, when determining a target pixel of an inputted image data, a difference in a total density of the two kinds of sub masks in a main scanning direction is added to a normalized difference in total density of the two kinds of sub masks in a sub scanning direction, and a resultant value is compared with a threshold value so as to determine if the target pixel is an edge area or not.

18 Claims, 9 Drawing Sheets

F I G. 2
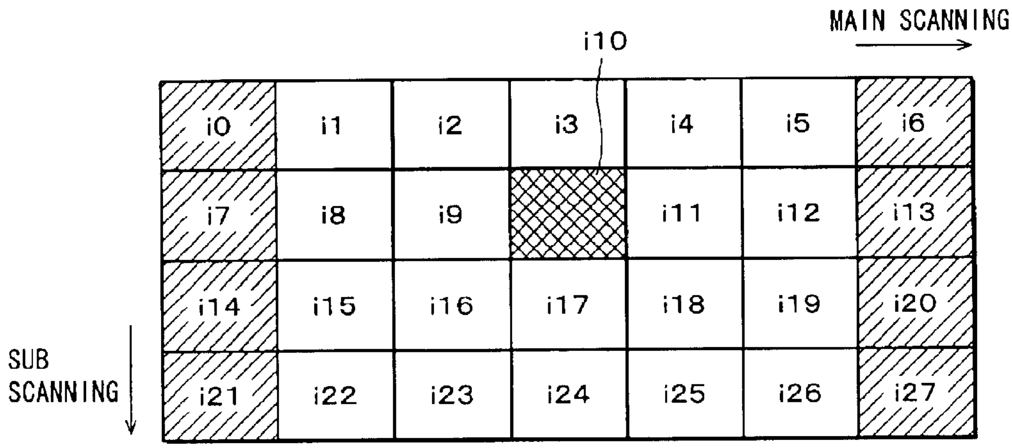
F I G. 3
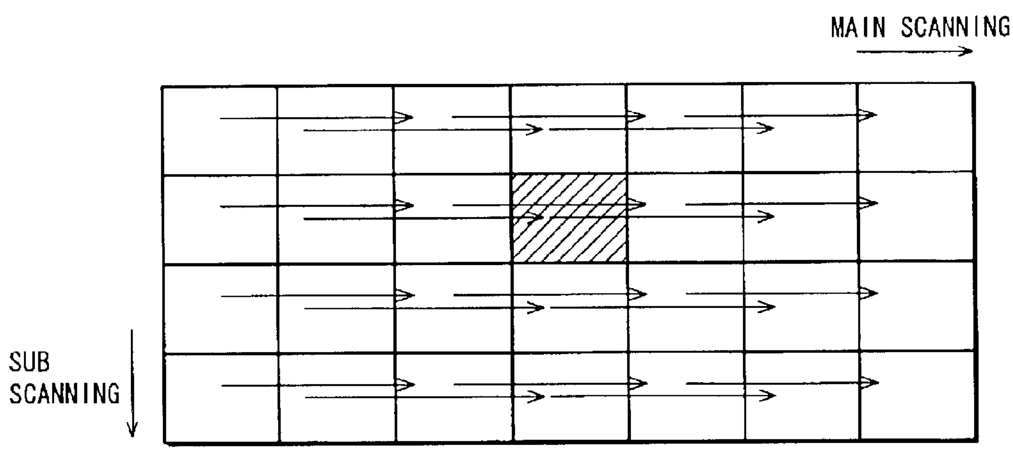

F I G. 4
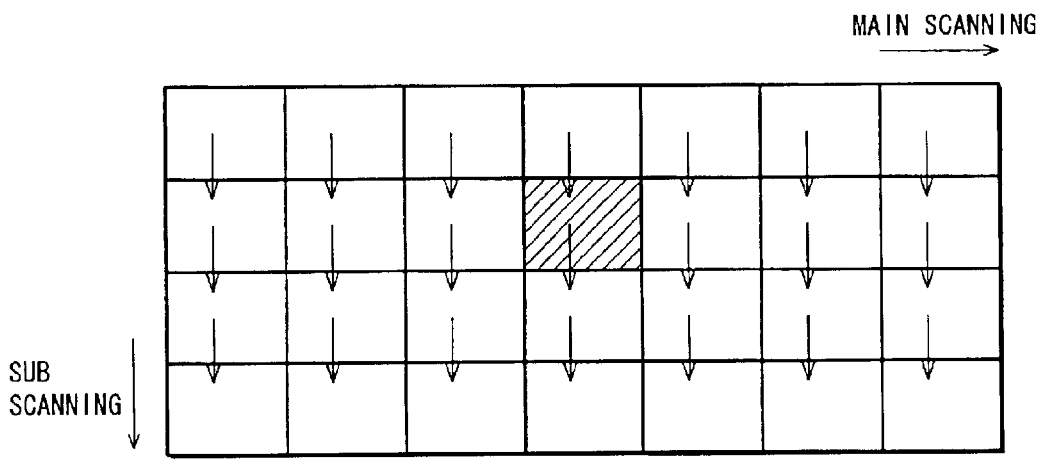

F I G. 5
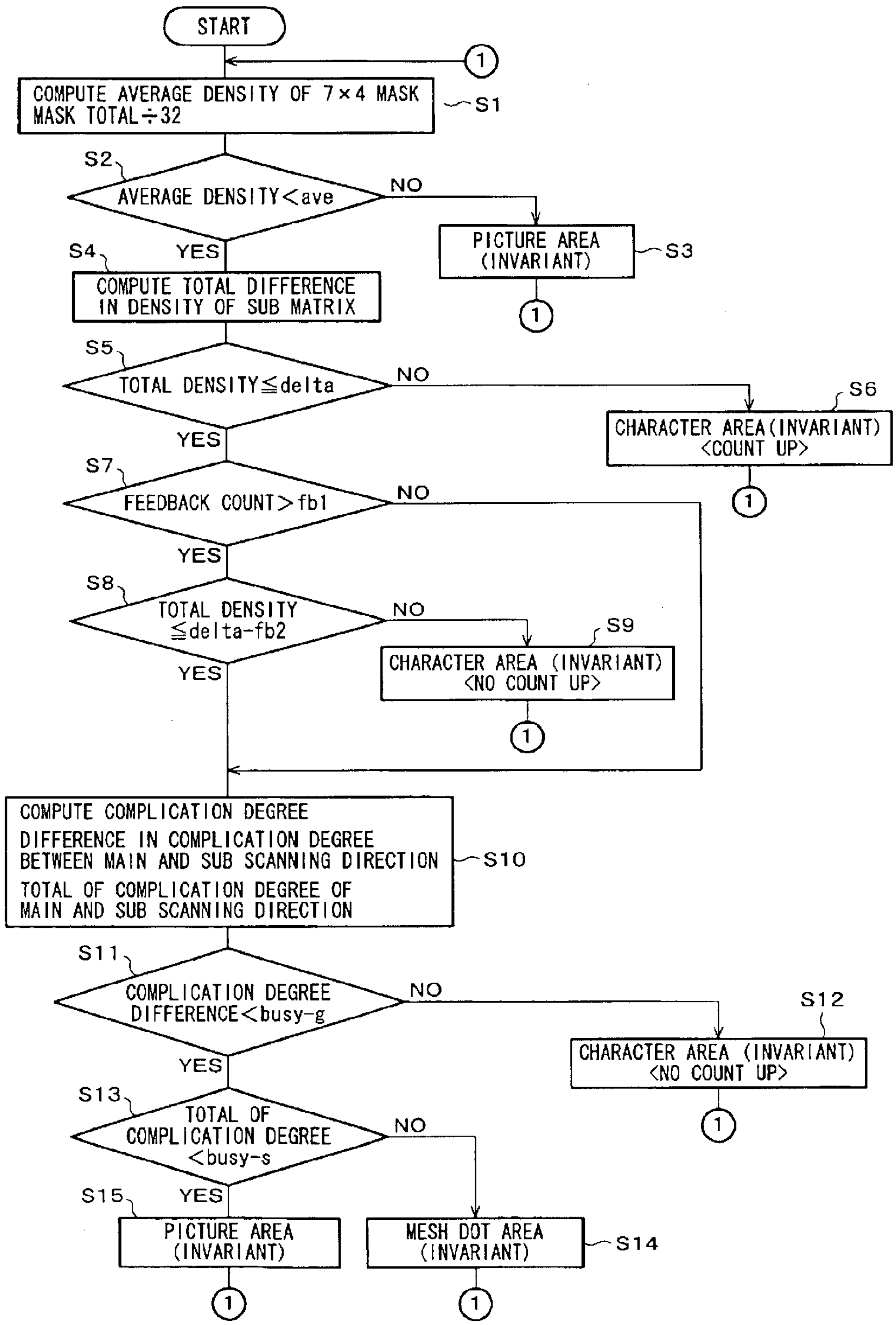

FIG. 7

| PICTURE | CHARACTER 1 | CHARACTER 2 | MESH DOT | AREA SETTING |
|---|---|---|---|---|
| 0 | 0 | 0 | 0 | 0 |
| 0 | 0 | 0 | 1 | 2 |
| 0 | 0 | 1 | 0 | 1 |
| 0 | 0 | 1 | 1 | 1 |
| 0 | 1 | 0 | 0 | 1 |
| 0 | 1 | 0 | 1 | 1 |
| 0 | 1 | 1 | 0 | 1 |
| 0 | 1 | 1 | 1 | 1 |
| 1 | 0 | 0 | 0 | 0 |
| 1 | 0 | 0 | 1 | 0 |
| 1 | 0 | 1 | 0 | 0 |
| 1 | 0 | 1 | 1 | 0 |
| 1 | 1 | 0 | 0 | 0 |
| 1 | 1 | 0 | 1 | 0 |
| 1 | 1 | 1 | 0 | 0 |
| 1 | 1 | 1 | 1 | 0 |

FIG. 8

| | | | | |
|---|---|---|---|---|
| 0 | 0 | 0 | 0 | 0 |
| 0 | 0 | 1 | 0 | 0 |
| 0 | 0 | 0 | 0 | 0 |
| 0 | 0 | 0 | 0 | 0 |

FIG. 9

| | | | | |
|---|---|---|---|---|
| −1 | −1 | −1 | −1 | −1 |
| −1 | −1 | 50 | −1 | −1 |
| −1 | −1 | −1 | −1 | −1 |
| −1 | −1 | −1 | −1 | −1 |

FIG. 10

| | | | | |
|---|---|---|---|---|
| −1 | −1 | 5 | −1 | −1 |
| 1 | 3 | 50 | 3 | 1 |
| −1 | −1 | 3 | −1 | −1 |
| −1 | −1 | 1 | −1 | −1 |

| | | |
|---|---|---|
| | p | a |
| b | c | d |

IMAGE PROCESSING DEVICE FOR IMAGE REGION DISCRIMINATION

FIELD OF THE INVENTION

The present invention relates to an image processing device which makes area determination (area separation) of a target pixel of inputted image data in a scanner, a digital copying machine, a fax machine and so on, and which performs image processing for each area.

BACKGROUND OF THE INVENTION

In a conventional image processing device, as disclosed in Japanese Unexamined Patent Publication no. 125857/1996 (Tokukaihei 8-125857, published on May 17, 1996), first and second characteristic parameters are found and inputted to a determination circuit using a nerve circuit network so as to perform area determination (area separation) of a target pixel. Here, the nerve circuit network is a non-linear type and has been learned in advance. Besides, the non-linear type means that inputs of first and second characteristic parameters are respectively converted to coordinates on a vertical axis and a horizontal axis, and a separating state is shown on the coordinates.

When performing area separation using the above non-linear separating method, it is necessary to widely memorize coordinates. These coordinates are called a lookup table, which is adopted for converting an output based on an input axis. Therefore, such a lookup table uses a memory for storing data. Further, the conventional arrangement has required considerably large memory.

SUMMARY OF THE INVENTION

The objective of the present invention is to provide an image processing device capable of making fast area determination with high accuracy at low cost in a simple manner, without the necessity for memory with a large capacity.

In order to attain the above objective, the image processing device of the present invention is characterized in that upon area determination of a target pixel in inputted image data, total densities are computed for at least four kinds of sub pixel groups provided in a main pixel group, which is constituted by a plurality of pixels including a target pixel, and area determination is made based on these total densities.

According to this arrangement, total densities of the four kinds of sub pixel groups are computed and area determination is made based on these total densities, so that memory with large capacity is not necessary for area determination. Further, the total densities are computed only by addition so as to provide an image processing device capable of fast area determination with high accuracy at low cost in a simple manner.

For a fuller understanding of the nature and advantages of the invention, reference should be made to the ensuing detailed description taken in conjunction with the accompanying drawings.

BRIEF DESCRIPTION OF THE DRAWINGS

FIG. 2 is an explanatory drawing showing a main mask and a sub mask that are used in area separation of the image processing device.

FIG. 3 is an explanatory drawing showing a computing method of a complication degree in a main scanning direction, the degree being used in area separation of the image processing device.

FIG. 4 is an explanatory drawing showing a computing method of a complication degree in a sub scanning direction, the degree being used in area separation of the image processing device.

FIG. 5 is a flowchart showing the steps of area separation of the image processing device.

FIG. 7 is a truth table in which areas are set according to the determination results of the parallel operation.

FIG. 8 is an explanatory drawing showing a filter coefficient of a non-edge area that is used for a filter processing of the image processing device.

FIG. 9 is an explanatory drawing showing a filter coefficient of an edge area that is used for the filter processing of the image processing device.

FIG. 10 is an explanatory drawing showing a filter coefficient of a mesh dot area that is used for the filter processing of the image processing device.

DESCRIPTION OF THE EMBODIMENTS

Referring to FIGS. 1 to 14, the following explanation describes one embodiment of the present invention.

Figure 1:
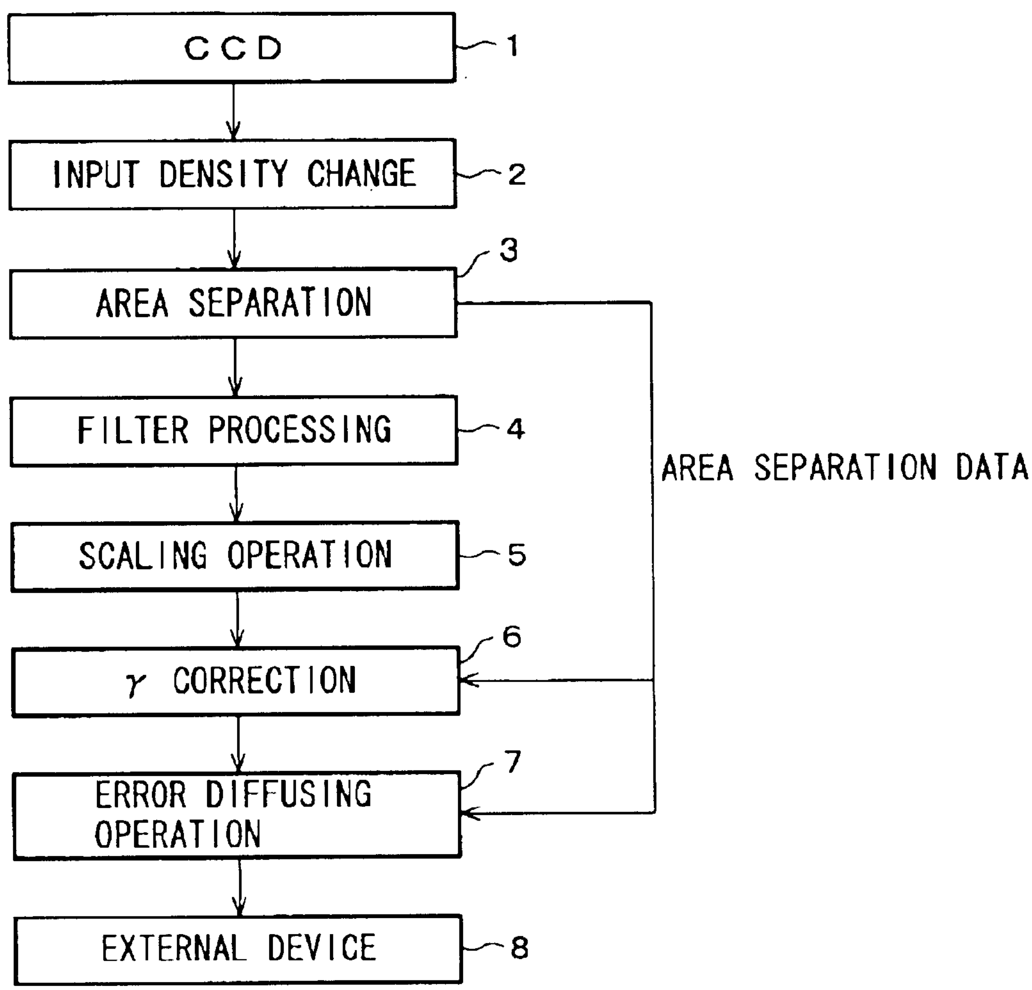
FIG. 1 shows the construction of an image processing device according to one embodiment of the present invention and image processing steps thereof.

As shown in FIG. 1, an image processing device of the present embodiment is constituted by an input density changing section 2, an area separating section 3, a filter processing section 4, a scaling section 5, a gamma correcting section 6, and an error diffusing section 7.

In an image processing of the image processing device, firstly, image data is inputted from a CCD (Charge Coupled Device) section 1 to the input density changing section 2. In the input density changing section 2, the inputted image data is changed to density data, and the image data changed to density data is transmitted to the area separating section 3.

In the area separating section 3, as will be described later, regarding inputted image data, a variety of area separation parameters such as a total density and a complication degree of a sub mask, and an area of a target pixel in image data is determined based on a computing result. The determined area is transmitted as area data to the filter processing section 4, the gamma correcting section 6, and the error diffusing section 7.

Image data from the area separating section 3 is transmitted to the filter processing section 4 as it is. In the filter processing section 4, as will be described later, a filter processing is performed on each area of image data based on a predetermined filter coefficient. The image data which has been subjected to a filter processing is transmitted to the scaling section 5.

In the scaling section 5, a scaling operation is performed based on a predetermined scaling rate. The image data which has been subjected to a scaling operation is transmitted to the gamma correcting section 6. In the gamma correcting section 6, as will be described later, a gamma changing operation is performed on a gamma correcting table which has been prepared in advance for each area of the image data. The image data which has been subjected to a gamma changing operation is transmitted to the error diffusing section 7.

In the error diffusing section 7, as will be described later, an error diffusing operation is performed based on an error diffusing parameter, which has been set in advance for each area of the image data. The image data processed in the error diffusing section 7 is transmitted to the external device 8. The external device 8 includes a memory, a printer, a PC, and so on.

The following discusses area separation processing performed by the area separating section 3. FIG. 2 shows the relationship between a main mask and a sub mask (also referred to as a "sub matrix") that are used for area separation. Here, main masks of a main pixel group are indicated by i0 to i27. Besides, a target pixel of the main mask is indicated by i10. Meanwhile, sub masks of a sub pixel group include four kinds of sub mask as follows.

Two sub masks are prepared as sub masks used in a main scanning direction. First sub masks in a main scanning direction are indicated by i0, i1, i2, i3, i4, i5, and i6. Second sub masks in a main scanning direction are indicated by i21, i22, i23, i24, i25, i26, and i27. The first and second sub masks in a main scanning direction make a pair.

Besides, two sub masks are prepared as sub masks used in the sub scanning direction. First sub masks in the sub scanning direction are indicated by i0, i7, i14, and i21. Second sub masks in the sub scanning direction are indicated by i6, i13, i20, and i27. The first and second sub masks in the sub scanning direction make another pair.

The following Table 1 shows the names of the first and second sub masks in the main scanning direction and the first and second sub masks in the sub scanning direction.

TABLE 1

| SUB MASK (SUB MATRIX) | NAME |
|---|---|
| i0, i1, i2, i3, i4, i5, i6, | mask-m1 |
| i21, i22, i23, i24, i25, i26, i27, | mask-m2 |
| i0, i7, i14, i21, | mask-s1 |
| i6, i13, i20, i27 | mask-s2 |

As mentioned above, in an area separation processing of the area separating section 3, the main masks and the sub masks are set and a total density is computed for each of the sub masks.

First, when a total density of the sub mask 'mask-m1' is represented by sum-m1, the total density is computed as follows.

$$\text{sum-}m\mathbf{1}=i\mathbf{0}+i\mathbf{1}+i\mathbf{2}+i\mathbf{3}+i\mathbf{4}+i\mathbf{5}+i\mathbf{6}$$

In the same manner, when a total density of the sub mask 'mask-m2' is represented by sum-m2, the total density is computed as follows.

$$\text{sum-}m\mathbf{2}=i\mathbf{21}+i\mathbf{22}+i\mathbf{23}+i\mathbf{24}+i\mathbf{25}+i\mathbf{26}+i\mathbf{27}$$

Furthermore, a total density is computed in the same manner regarding the sub masks in a sub scanning direction. When a total density of the sub mask 'mask-s1' is represented by sum-s1, the total density is computed as follows.

$$\text{sum-}s\mathbf{1}=i\mathbf{0}+i\mathbf{7}+i\mathbf{14}+i\mathbf{21}$$

In the same manner, when a total density of the sub mask 'mask-s2' is represented by sum-s2, the total density is computed as follows.

$$\text{sum-}s\mathbf{2}=i\mathbf{6}+i\mathbf{13}+i\mathbf{20}+i\mathbf{27}$$

The four kinds of sub masks and two pairs of total densities are computed by the above equations. Subsequently, a sum S of total density differences of the pairs, i.e., a sum of a) a total density difference between two sub masks in a main scanning direction and b) a total density difference of two sub masks in a sub scanning direction is computed by the following equation.

$$S=|\text{sum-}m\mathbf{1}-\text{sum-}m\mathbf{2}|+(|\text{sum-}s\mathbf{1}-\text{sum-}s\mathbf{2}|)\times\alpha \quad (1)$$

Here, α of the equation (1) is a coefficient for normalizing a difference in size (number of pixels) between a sub mask in a main scanning direction and a sub mask in a sub scanning direction. In this case, a is set at 7/4.

The sum S of total density differences is computed as above and is compared with a predetermined threshold value. When the sum S is larger than a threshold value, the area is determined as an edge area; otherwise, the are is determined as a non-edge area. The following Table 2 shows determination results of the area separation processing with a threshold value set at "150".

TABLE 2

| TARGET TO BE DETERMINED | SUM S OF TOTAL DENSITY DIFFERENCES | DETERMINATION RESULTS |
|---|---|---|
| PICTURE CONTINUOUS TONE PART | 5 to 30 | ONLY NON-EDGE AREAS |
| 10-POINT CHARACTER PART | 140 to 320 | MOSTLY EDGE AREAS OTHER THAN SOME NON-EDGE AREAS |

As described above, it is possible to perform area separation between picture continuous tone part and a 10- point character part simply by computing the sum S of total density differences. Additionally, a range of a threshold value is not particularly limited.

Moreover, in the area separation, a size (number of pixels) in a sub scanning direction is relatively small so as to save line memory. Furthermore, in the area separation, the sub masks are disposed on the right, left, upper, and bottom ends of the main mask. A position of the sub mask can be arbitrarily changed according to a size of the main mask, a detected image, and an input resolution.

Here, in the area separation, the sub mask differs in shape (size) between a main scanning direction and a sub scanning direction, so that a normalization coefficient is multiplied. However, a normalization coefficient does not need to be multiplied as long as the shape remains the same.

Regarding the area separation, the following describes an example using a complication degree.

Together with a sum S of total density differences regarding each pair of sub masks, a total of density differences is computed regarding pixels adjacent in a main scanning direction in the main mask and pixels adjacent in a sub scanning direction. Here, a total of density differences is referred to as a complication degree. However, in the area separation, a total of density differences is computed in a main scanning direction for every other pixel, not adjacent pixels. A complication degree also includes a total of density differences between pixels disposed with a predetermined interval.

Firstly, referring to FIGS. 3 and 4, the following describes a method of computing a complication degree of the main mask. As shown in FIG. 3, when a complication degree is computed in a main scanning direction, a density difference is computed between a pixel on the top of the arrow and a pixel on the rear end of the arrow, and density differences of all the arrows are summed. Thus, a total of density differences is computed on twenty places in total in a main scanning direction. Here, a density difference is an absolute value between a pixel on the top of an arrow and a pixel on the rear end of the arrow.

Regarding computing of a complication degree in a sub scanning direction, as shown in FIG. 4, a density difference is computed between a pixel on the top of an arrow and a pixel on the rear end of the arrow, and density differences of all the arrows are summed. Thus, a total of density differences is computed on twenty one places in total in a sub scanning direction. Here, a density difference is an absolute value between a pixel on the top of an arrow and a pixel on the rear end of the arrow.

As described above, in the area separation processing, density differences are summed for every other pixel so as to compute a complication degree in a main scanning direction. Meanwhile, density differences between adjacent pixels are summed so as to compute a complication degree in a sub scanning direction.

Here, a complication degree computed in a main scanning direction is represented by busy-m, and a complication degree computed in a sub scanning direction is represented by busy-s. In this case, a differential value 'busy-gap' of these complication degrees is computed as follows.

$$\text{busy-gap}=|\text{busy-}m-\text{busy-}s|$$

And then, in contrast to a non-edge area detected by the sum S of total density differences, when the differential value busy-gap of the total complication values is larger than a predetermined threshold value ('120' in the following example), the area is determined as an edge area; otherwise, the area is determined as a non-edge area. Hence, a differential value busy-gap makes it possible to extract an edge area on a part which is hardly detected by the sum S of total density differences.

Subsequently, a total value busy-sum, which is a total of complication degrees in a main scanning direction and a sub scanning direction, is computed as follows.

$$\text{busy-sum}=\text{busy-}m+\text{busy-}s$$

In contrast to a non-edge area detected by the sum S of total density differences and a differential value busy-gap of complication degrees; when a total value busy-sum of complication degrees is larger than a predetermined threshold value ('180' in the following example), the area is determined as a mesh dot area; otherwise, the area is determined as a non-edge area. Table 3 shows each characteristic quantity of a mesh dot area and the determination results when area determination is made by the above area separation processing. Here, a range of each threshold value is not particularly limited.

TABLE 3

| | MESH DOT (BLACK AND WHITE 175 LINES, 30% DENSITY) | EACH THRESHOLD VALUE | DETERMINATION RESULT |
|---|---|---|---|
| SUM S OF DENSITY DIFFERENCES | 50 to 80 | 150 | NON-EDGE |
| busy-gap | 40 to 90 | 120 | NON-EDGE |
| busy-sum | 230 to 340 | 180 | MESH DOT |

"Black and white 175 lines, 30% line density" of Table 3 indicates that a printed matter has a resolution of 175 lines and black and white ratio is 30%. As shown above, the mesh area is determined as a non-edge area in determination made by a sum S of total density differences and a differential value busy-gap of complication degrees. However, based on a computing result of a characteristic quantity of a busy-sum, which is a total value of complication degrees, the area can be determined as a mesh dot area.

The following describes an example of the area separation using an average density or a total density of the main mask. A complete average density, a simplified average density, and a total density in the main mask of FIG. 2 are computed as follows.

$$\text{complete average density}=(\text{total of } i\mathbf{0} \text{ to } i\mathbf{27})/28$$

$$\text{simplified average density}=(\text{total of } i\mathbf{0} \text{ to } i\mathbf{27})/32$$

32 is $2^5$ (5-bit shift)

$$\text{total density}=(\text{total of } i\mathbf{0} \text{ to } i\mathbf{27})$$

In the area separation, any one of the complete average density, the simplified average density, and the total density is applicable. These densities have the following characteristics.

With the complete average density, an average density of the main mask can be computed without an error; however, a coefficient of division is "28", so that the speed is not high as the simplified average density. Thus, another division circuit is necessary.

The simplified average density causes an error of "28/32" relative to the complete average density. However, when an image has a density of 8 bits and 256 levels of gradation, a density value may be increased to 13 bits to a maximum by computing a total density. In this case, the maximum value can be shifted by 5 bits. Thus, area determination is possible with a comparator having a maximum density of 8 bits.

The total density is the most simple. In the case of an image density of 8 bits and 256 levels of gradation, a comparator with a maximum density of 13 bits is necessary.

In the area separation processing, area determination using one of the complete average density, the simplified average density, and the total density is performed before computing characteristic quantities such as the sum S of total density differences, a differential value busy-gap of a complication degree, and a total value busy-sum of a complication degree. Further, in the area determination using one of the complete average density, the simplified average density, and the total density, a computed density value is compared with a predetermined threshold value. When the density value is not less than the threshold value, an area is determined as a non-edge area. Additionally, the determined non-edge area remains the same in the area determination thereafter. This arrangement makes it possible to prevent an edge area from being detected on a high-density part.

If a high-density part is determined as an edge area, an error such as a contour may appear on a high-density part and a halftone area in a filter processing thereafter (described later). To prevent such a problem, as described above, area determination using one of the complete average density, the simplified average density, and the total density is performed so as to prevent the appearance of an edge area on a high-density part.

And then, referring to FIG. 5, the following discusses an operation example in which a threshold value of edge determination is changed in the area separation processing based on an edge determination result obtained by the above sum S of total density differences.

In the area separation processing shown in FIG. 5, a simplified average density in the main mask is computed (step S1), and the density is compared with a threshold value ave (S2). When the simplified average density is at the threshold value ave or more, the area is determined as a picture area (non-edge area), and the determination result remains the same in area determination thereafter (S3).

When the simplifed average density is smaller than the threshold value ave, a sum S of total density differences of the foregoing sub mask (sub matrix) is computed (S4), and the sum S is compared with a threshold value delta (delta=150) (S5). When the sum S of total density differences is larger than the threshold value dalta, the area is determined as a character area (edge area), and the determination result remains the same in area determination thereafter (S6). Further, when the area is determined as a character area in S6, a feedback count is increased by "1". The feedback count is compared with a threshold value fb1 when the sum S of total density differences is at the threshold value 'delta' or less in S5 (S7). A threshold value fb1 is provided for determining a degree of the occurrence of a character area in a predetermined history. In the area separation processing, the predetermined history is a previous history of eight pixels and a threshold value fb1 is set at "2".

Therefore, relative to a previous history of eight pixels, when an edge determination result regarding the sum S of total density differences has three pixels or more (namely, when a feedback count is larger than a threshold value fb1), the edge determination threshold value 'delta' is reduced by a predetermined amount fb2 (fb2=80). The reduced threshold value delta-fb2 is compared with the sum S of total density differences (S8). When the sum S of total density differences is larger than the threshold value delta-fb2, the area is determined as a character area, and the determination result remains the same in area determination thereafter (S9).

As described above, a threshold value of edge determination is changed based on an edge determination result of the previous history, and feedback correction is carried out so as to improve accuracy of edge determination based on the previous history.

When a feedback count is determined as a threshold value fb1 or less in S7, or when the sum S of total density differences is determined as a threshold value delta-fb2 or less, area separation processing is performed based on a complication degree.

A differential value busy-gap is computed between complication degrees in a main scanning direction and in a sub scanning direction, and a total value busy-sum is computed between complication degrees in a main scanning direction and in a sub scanning direction (S10). And then, the differential value busy-gap of complication degrees is compared with a predetermined threshold value busy-g (busy-g=120) (S11).

When the differential value busy-gap of complication degrees is not less than the threshold value busy-g, the area is determined as a character area (edge area), and the determination result remains the same in area determination thereafter (S12). When the differential value busy-gap of complication degrees is smaller than the threshold value busy-g, a total value busy-sum of complication degrees is compared with a predetermined threshold value busy-s (busy-s=180) (S13). When the total value busy-sum of complication degrees is not less than the threshold value busy-s, the area is determined as a mesh dot area (S14). When the total value busy-sum of complication degrees is smaller than the threshold value busy-s, the area is determined as a picture area (S15).

When an area is determined in S3, S6, S9, S12, S14, or S15, the step returns to ①of FIG. 5, and the foregoing area separation processing is performed on the following pixel.

As earlier mentioned, the area separation processing is carried out in the order of: determination based on an average density in the main mask, determination based on a sum S of total density differences of sub masks, determination based on feedback correction, determination based on a differential value busy-gap of complication degrees, and determination based on a total value busy-sum of complication degrees. In each determination, each of the above characteristic quantities (area separation parameters) is compared with each threshold value, and the area is determined. With this arrangement, the area separation processing does not require large memory, and three kinds of an edge area, a non-edge area, and a mesh area can be detected only by comparing characteristic quantities with threshold values.

Further, in a hardware arrangement, the operation based on the above characteristic quantities is not carried out in the above order but the characteristic quantities (an average density, a sum S of total density differences, a differential value busy-gap, a total value busy-sum) are computed and processed in parallel through a so-called pipeline operation so as to provide a simple hardware system with higher speed.

Figure 6:
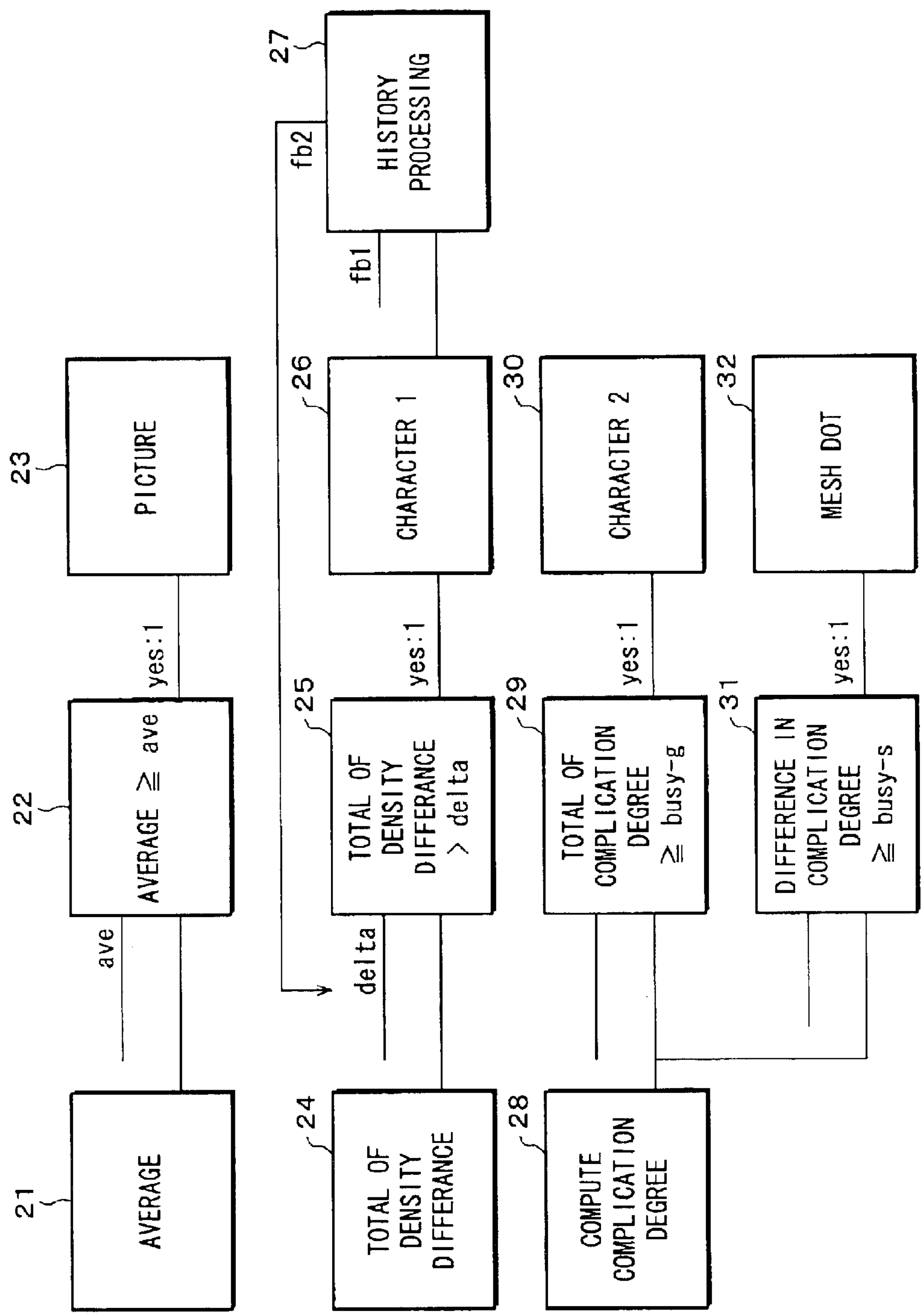
FIG. 6 is a block diagram showing area separation performed by a parallel operation of the image processing device.

FIG. 6 is a block diagram showing the area separation processing using a parallel operation. The operations of blocks 21 to 23 correspond to steps Si to S3. Moreover, the operations of blocks 24 to 27 correspond to steps S4 to S9), and the operations of blocks 28 to 32 correspond to steps S10 to S15. In this case, the operations of the blocks 21 to 23, the operations of the blocks 24 to 27, and the operations of the blocks 28 to 32 are performed in parallel.

Besides, FIG. 7 is a truth table corresponding to FIG. 6, in which an area is set based on each result determined by the parallel operation. In FIG. 7, in a column "area setting", "0" indicates a picture area, "1" indicates a character area, and "2" indicates a mesh dot area. Further, in FIG. 7, columns "picture", "character 1", "character 2", and "mesh dot" respectively correspond to the block 23, the block 26, the block 30, and the block 32. When the blocks 22, 25, 29, and 31 the determination results of "yes", each of the columns turns "1". In the case of "no", each of the columns turns "0".

As described above, an area is determined as shown in the truth table of FIG. 7 based on each result of the parallel operation so as to provide a simple hardware system with a higher speed.

The following describes the filter processing which is performed in the filter processing section 4 of FIG. 1 based on a detection result of the area separation processing.

In the filter processing section 4, the filter processing is carried out using a filter coefficient previously set for each area. FIG. 8 shows a filter coefficient of a non-edge area, FIG. 9 shows a filter coefficient of an edge area, and FIG. 10 shows a filter coefficient of a mesh dot area. Here, in the filter processing shown in FIGS. 8 to 10, sums of products of image densities and values shown in lattices are respectively divided by 1, 31, and 55.

In this filter processing, a mask in a sub scanning direction is identical in size to a mask used in the area separation processing. Actually, in the case of a hardware construction, even when a mask size (particularly the number of lines in a sub scanning direction) is reduced in the area separation, the larger a filter processing mask is, the larger line memory is necessary.

Moreover, in the filter processing, an emphasizing level of the filter is the highest on an edge area and is the lowest on a non-edge area. Hence, based on detection results of the area separation processing, a filter coefficient is changed for each area so as to achieve an image processing with high picture quality.

Here, another coefficient is applicable as a filter coefficient for each area.

Next, the following describes the gamma changing operation performed in the gamma correcting section 6 based on the detection result of the area separation processing.

Figure 11:
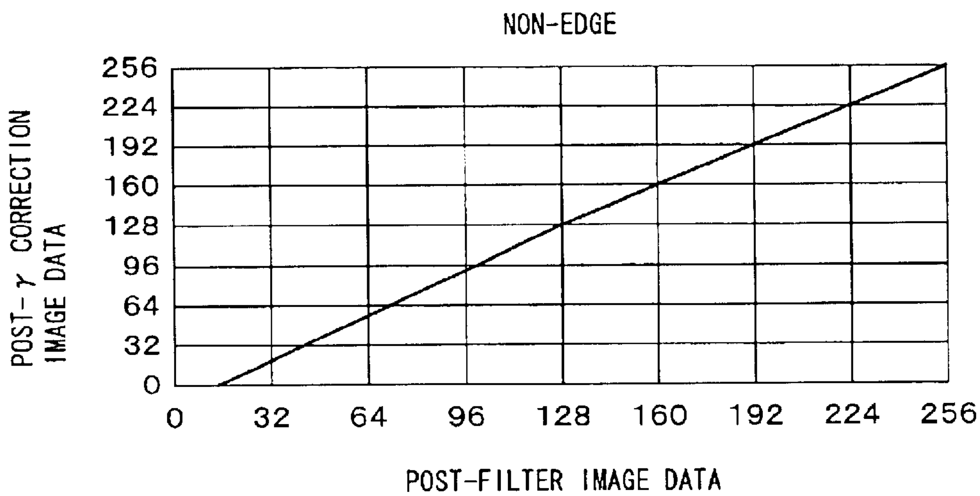
FIG. 11 is a γ correction graph regarding a non-edge area in a gamma changing operation of the image processing device.

In the gamma correcting section 6, the gamma changing operation is performed on each area by using a gamma correcting table which has been previously prepared. FIG. 11 shows a γ correction graph of a non-edge area. An input axis indicates post filter image data. In this example, an input has 8 bits and 256 levels of gradation, and an output also has 8 bits and 256 levels of gradation.

Figure 12:
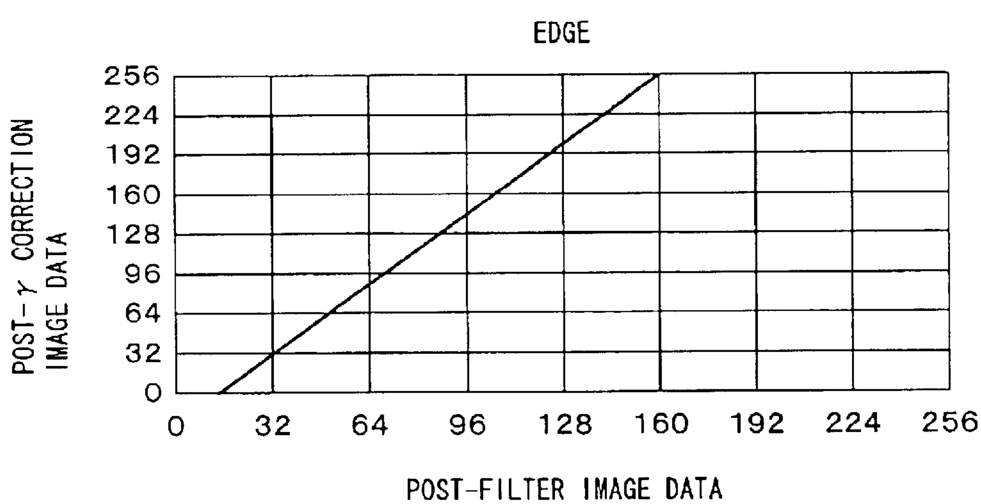
FIG. 12 is a γ correction graph regarding an edge area in a gamma changing operation of the image processing device.
Figures 13, 14:
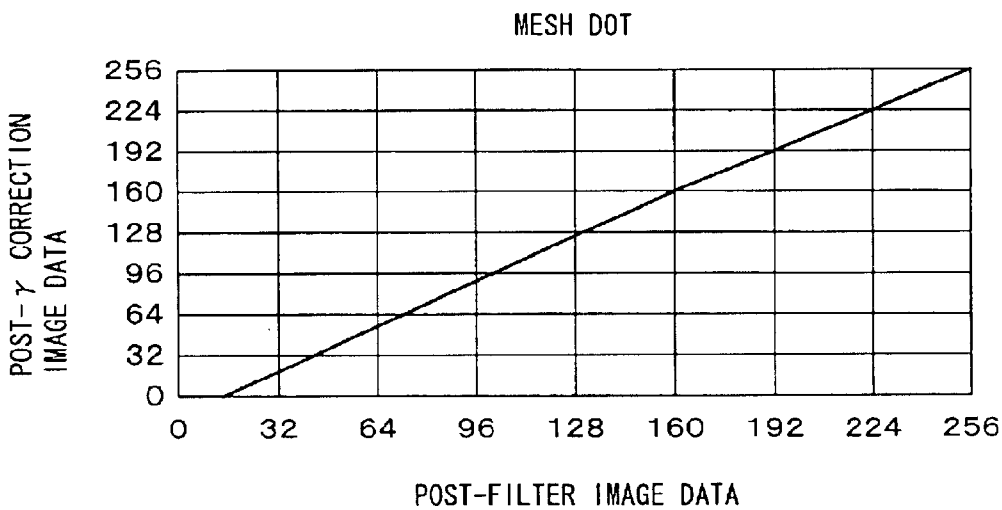
FIG. 13 is a γ correction graph regarding a mesh dot area in a gamma changing operation of the image processing device.
FIG. 14 is an explanatory drawing showing the relationship between a target pixel and an error diffusion mask that are used for an error diffusing operation of the image processing device.

FIG. 12 shows a γ correction graph of an edge area. Input and output axes are the same as those of FIG. 11. Only when the area is determined as an edge area, an operation is carried out using a γ correction graph of FIG. 12. Furthermore, FIG. 13 shows a γ correction graph of a mesh dot area. Input and output axes thereof are the same as those of FIG. 11. Only when the area is determined as a mesh dot area, an operation is carried out using a γ correction graph of FIG. 13.

An actual hardware construction uses memory such as SRAM (static RAM) and ROM with an input of 8 bits and an output of 8 bits and 256 bytes, and after data is inputted to an address of SRAM and ROM on the input axis, image data subjected to γ changing is outputted from the output.

In comparison of γ correction graphs of FIGS. 11 to 13, γ correction on an edge area makes the most rapid increase (namely, output data is large relative to input data). The gamma correcting table is set in this manner so as to clearly reproduce an edge area and an edge area with a low density. In other words, different gamma correcting tables are respectively used for areas in a gamma changing operation based on the detection results of the area separation. Thus, image processing with higher picture quality is available.

The following describes an error diffusing operation performed in the error diffusing section 7 of FIG. 1.

In the error diffusing section 7, an error diffusion parameter is switched based on a result of the area separation processing, and an error diffusing operation is performed on each area by using a predetermined error diffusion parameter.

First, the following discusses an error diffusing operation. In this example, a binary error diffusing operation is carried out. The error diffusion is a kind of presentation of a dummy halftone and has been used as an image processing technique these days. FIG. 14 shows the relationship between a target pixel and an error diffusion mask. p represents a target pixel, and a to d represent pixels diffusing an error. First, when the target pixel p has a density of Dp, an error amount of Er, and a quantization threshold value (error diffusion parameter) of Th, the following relationship is established.

$$Dp<Th \rightarrow \text{quantized by 0 } Er=Dp$$

$$Dp \geqq Th \rightarrow \text{quantized by 255 } Er=Dp-255$$

An error amount Er computed as above is diffused on the pixels a to d of FIG. 14 by a certain coefficient. Namely, the pixels a to d respectively have coefficients Wa to Wd, and the total is set at 1. An error of Er×Wa is computed on the pixel a, an error of Er×Wb on the pixel b, an error of Er×Wc on the pixel c, and an error of Er×Wd on the pixel d. These errors are respectively added to the current density values of the pixels.

As described above, an error occurred in the target pixel is distributed to a predetermined pixel with a predetermined coefficient so as to quantize the target pixel. The quantized pixel is set at 0 or 255. Thus, assuming that 0 corresponds to 0, and 255 corresponds to 1, binary error diffusion is possible.

As shown in Table 4 below, in the image processing, a quantization threshold value Th serving as an error diffusion parameter is changed based on the result of the area separation processing.

TABLE 4

| | Th |
|---|---|
| NON-EDGE AREA | 128 |
| EDGE AREA | 100 |
| MESH DOT AREA | 128 |

As shown above, a quantization threshold value Th on an edge area is set smaller than other areas so as to clearly reproduce an edge area. Namely, based on detection results of the area separation processing, error diffusion is performed using different error diffusion parameters respectively for the areas, so that image processing is possible with higher image processing.

Additionally, in the above example, a quantization threshold value Th is changed as an error diffusion parameter. However, a parameter to be changed is not particularly limited, so that other error diffusion parameters can be changed.

Besides, when area determination is made based on a total density of the four kinds of sub masks, the following area determination is possible in addition to the foregoing examples. Assuming that the four kinds of sub masks have total densities sum1, sum2, sum3, and sum4, a maximum value and a minimum value are computed for each of sum1 to sum4. The resultant values are respectively referred to as max and min. It is possible to make area determination based on a difference between max and min, i.e., a computing result of max−min. Namely, according to the area determination, when a computing result of max−min is larger than a predetermined threshold value, the area is determined as an edge area; otherwise, the area is determined as a non-edge area.

In the image processing device of the present invention, when making area determination on a target pixel of an image data to be inputted, a total density is computed regarding at least the four kinds of sub pixel groups, that are provided in a main pixel group constituted by a plurality of pixels including a target pixel, and area determination is made based on these total densities.

In the above area determination, it is preferable to determine if the target pixel is on an edge area or not. Hence, based on total densities of the four kinds of the sub pixel groups, an area can be divided into two kinds of areas, an edge area and a non-edge area. Here, an edge area is an area having a large difference in density. A character area is included in an edge area.

Further, when the sub pixel groups are different in size from one another, it is preferable to carry out normalization according to a coefficient. Therefore, even in the case of different sizes of sub pixel groups, area separation is possible with high accuracy. Moreover, this arrangement makes it possible to reduce the number of lines in a sub scanning direction. A size in a sub scanning direction affects the number of lines of line memory. Hence, the number of lines in a sub scanning direction is reduced so as to provide an inexpensive image processing device.

Also, it is preferable to dispose the sub pixel groups on or around the ends of the main pixel group. For example, the four kinds of sub pixel groups are respectively disposed on the upper, bottom, left, and right ends or around the ends of the main pixel group, so that information can be widely collected relative to a size of the main pixel group, thereby improving accuracy of area separation.

Further, it is preferable to categorize the total densities of the four kind sub pixel groups into two groups, to compute a value S by adding total density differences of the two groups, and to make area determination based on the value S. Hence, an adder for computing a total density, a subtracter for computing a difference in total density of the groups, and a comparator are used for area determination. Consequently, it is possible to provide an image processing device which can readily make fast area determination with high accuracy at low cost.

Also, it is preferable to compute a complication degree which is a total of density differences between adjacent pixels or pixels disposed with a fixed interval in a main scanning direction, and a complication degree which is a total of density differences between adjacent pixels or pixels disposed with a fixed interval in a sub scanning direction, and it is preferable to make area determination based on the computing results. This arrangement makes it possible to further improve accuracy of area separation.

Additionally, after determination is made based on the value S if a target pixel is an edge area or not, it is preferable to compute a difference between a complication degree in a main scanning direction and a complication degree in a sub scanning direction regarding a non-edge area, and to determine again if the target pixel is an edge area or not based on the computing result. Thus, it is possible to detect an edge area which has not been detected using the value S.

Further, after determination is made if a target pixel is an edge area or not, it is preferable to compute a total of a complication degree in a main scanning direction and a complication degree in a sub scanning direction regarding a non-edge area, and to determine if the target pixel is a mesh dot area or a non-edge area based on the computing result. Hence, the area is divided into three areas of an edge area, a non-edge area, and a mesh dot area.

Furthermore, a complication degree in a main scanning direction is preferably a total of density differences of every other pixel, and a complication degree in a sub scanning direction is preferably a total of density differences of adjacent pixels. Hence, it is possible to compute a complication degree suitable for an input resolution and a size of the main pixel group (mask size).

Additionally, it is preferable to include the step of computing an average density or a total density in the main pixel group and determining if a target pixel is an edge area or not based on the computing results. Thus, it is possible to prevent a high-density part from being detected as an edge area. Particularly when a filter processing is performed on a high-density part of a halftone image, it is possible to prevent a problem such as a boundary on an image. Besides, determination is made based on a total density of the main pixel group so as to determine if a target pixel is an edge area or not without the necessity for a division circuit.

Also, when an average density in the main pixel group is computed, it is preferable to divide a total density by a power of 2, which is the closest to the number of pixels, not by the number of pixels. Hence, in a hardware construction, division is made by a bit shift, so that a value close to an average density can be computed without the necessity for a division circuit.

Besides, when determination is made if a target pixel is an edge area or not based on a total density of the sub pixel groups, after determination of an edge area is successively made for a predetermined times or with a predetermined frequency, it is preferable to change a threshold value for determining if a target pixel is an edge area or not. Thus, it is possible to further improve accuracy of determining an edge area.

Further, upon area determination, it is preferable to perform a plurality of determination operations in a predetermined order. For example, the order of priority is used in area determination, and an area is determined based on the order so as to perform area separation only by determination using a threshold value, without the necessity for a complicated lookup table and circuit.

Furthermore, the following order is preferable: determination based on a computing result of an average density or a total density in the main pixel group, determination based on the value S, determination based on a difference between complication degrees in the main scanning direction and the sub scanning direction, and determination based on a total of complication degrees in the main scanning direction and the sub scanning direction. Hence, a desirable result can be achieved in the area separation.

Moreover, it is preferable to change a coefficient of filter processing based on an area determined in the area determination processing. This arrangement makes it possible to provide an image processing device with high picture quality.

Also, it is preferable to change a gamma correction table based on an area determined in the area determination processing. This arrangement makes it possible to provide an image processing device with high picture quality.

Besides, it is preferable to change an error diffusion parameter based on an area determined by the area determination processing. This arrangement makes it possible to provide an image processing device with high picture quality.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image processing device comprising:

comparing means for comparing a value S corresponding to a sum of a total density difference of two sub mask pixel groups in a main scanning direction and a total density difference of two sub mask pixel groups in a sub scanning direction with a threshold value, the sub mask pixel groups being provided in a main pixel group constituted by a plurality of pixels including a target pixel, and area determination means for determining whether said target pixel is an edge area or not based on said comparison.

2. The image processing device as defined in claim 1, wherein normalization is performed with a coefficient when said sub mask pixel groups are different in size from one another.

3. The image processing device as defined in claim 1, wherein said sub mask pixel groups are disposed on or around an end of said main pixel group.

4. The image processing device as defined in claim 1, wherein in said main pixel group, a main scanning complication degree is computed by summing density differences between adjacent pixels or pixels disposed with a fixed interval in a main scanning direction, and a sub scanning complication degree is computed by summing density differences between adjacent pixels or pixels disposed with a fixed interval in a sub scanning direction, and area determination is further made based on a computing result.

5. The image processing device as defined in claim 4, wherein after determination is made based on the value S if the target pixel is an edge area or not, a difference is computed between the main scanning complication degree in a main scanning direction and the sub scanning complication degree in a sub scanning direction regarding a non-edge area, and determination is made again if the target pixel is an edge area or not based on the computing result.

6. The image processing device as defined in claim 4, wherein after determination is made based on the value S if the target pixel is an edge area or not, a total of the main scanning complication degree in a main scanning direction and the sub scanning complication degree in a sub scanning direction is computed regarding a non-edge area, and determination is made again if the target pixel is a mesh dot area corresponding to an image area or a non-edge area based on the computing result.

7. The image processing device as defined in claim 4, wherein the main scanning complication degree in a main scanning direction is a total of density differences of every other pixel, and the sub scanning complication degree in a sub scanning direction is a total of density differences of adjacent pixels.

8. The image processing device as defined in claim 1, wherein an average density or a total density of said main pixel group is computed, and determination is made based on the computing result if the target area is an edge area or not.

9. The image processing device as defined in claim 8, wherein upon computing an average density of said main pixel group, a total density is not divided by the number of pixels but by a power of 2 being the closest to the number of pixels.

10. The image processing device as defined in claim 1, wherein when determining if a target pixel is an edge area or not based on a total density of said sub pixel groups, after determination of an edge area is successively made for a predetermined times or with a predetermined frequency, a threshold value for determining if the target pixel is an edge area or not is changed.

11. The image processing device as defined in claim 1, wherein when performing area determination, a plurality of determining operations are performed in a predetermined order.

12. The image processing device as defined in claim 11, wherein determination is made based on a computing result of an average density or a total density of said main pixel group, before determination based on the value S, determination based on a difference between the complication degrees in a main scanning direction and in a sub scanning direction, and determination based on a total of the complication degrees in a main scanning direction and in a sub scanning direction.

13. The image processing device as defined in claim 11, wherein determination is made in an order of:

determination based on a computing result of an average density or a total density of said main pixel group, determination based on the value S, determination based on a difference between the complication degrees in a main scanning direction and in a sub scanning direction, and determination based on a total of the complication degrees in a main scanning direction and in a sub scanning direction.

14. The image processing device as defined in claim 1, wherein area determination is determined by methods that are executed in parallel, wherein said methods include:

determination based on a computing result of an average density or a total density of said main pixel group, determination based on the value S, determination based on a difference between the complication degrees in a main scanning direction and in a sub scanning direction, and determination based on a total of the complication degrees in a main scanning direction and in a sub scanning direction.

15. The image processing device as defined in claim 14, wherein said area determination made in said parallel operation uses a truth table.

16. An image processing device as recited in claim 1 further including a filter processing section that filters each area of the image data based on a predetermined filter coefficient.

17. An image processing device as recited in claim 1 further including a gamma correcting section that performs gamma correction on each area of the image data using a predetermined gamma correction table.

18. An image processing as recited in claim 1 further including an error diffusion section that performs error diffusion based on an error diffusion parameter that has been preset for each area of the image data.

* * * * *